Patented Jan. 3, 1939

2,142,144

UNITED STATES PATENT OFFICE

2,142,144

PROCESS OF CONDENSING ORGANIC SULPHUR COMPOUNDS

Joseph C. Patrick, Morrisville, Pa., assignor to Thiokol Corporation, Yardville, N. J., a corporation of Delaware No Drawing. Application October 4, 1937, Serial No. 167,330

8 Claims. (Cl. 260—79)

This invention relates to the production of a synthetic substance similar in some respects to rubber and having numerous properties which make it superior to rubber and capable of wide application in the useful arts, including such uses as solvent-proof flexible conduits, oil- and solvent-proof coatings for garments and gloves, gas-impervious cloth for balloons and dirigibles, as well as gas masks, all sorts of molded articles, etc.

This application is a continuation-in-part of my copending application Serial No. 733,123, filed June 29, 1934, and Serial No. 79,926, filed May 15, 1936.

I have found that for chemical and commercial reasons there should be two stages in the production of the ultimate product, a first stage in which an intermediate product is produced preferably by a wet reaction, i. e., one carried out in the presence of a solvent or liquid medium and a later stage in which the intermediate product is converted to the final stage.

The intermediate product can be produced in any desired quantities and in a predetermined condition of purity and consistency. For example, it may be a tough dough.

This intermediate product may be produced and sold in a uniform condition as raw material for a wide variety of uses. To the producer of the intermediate material, that is his final product. He sells it and to his vendee it is raw material. One hundred buyers may make from this raw material as many different articles having different shapes, forms and uses.

To give an example of the manner in which I prepare the intermediate material and a typical case of the manner in which this material may be utilized by a buyer thereof, the following data is supplied:

A. PREPARATION OF INTERMEDIATE MATERIAL

*Example 1.*—3000 liters of 2 molar sodium tetrasulphide solution containing 1044 kilograms or 6000 gram mols of sodium tetrasulphide, are treated with 8 kilograms of NaOH followed by 20 kilograms of $MgCl_2.6H_2O$, in a reaction vessel provided with coils for heating and cooling and an agitator. 6000 gram mols of ethylene dichloride are slowly added during about 3 hours. The temperature is maintained at about 160° F. during this time. Then the temperature is raised to about 200° F. and held there about an hour with agitation. The reaction product is a polysulphide polymer in the form of a latex-like liquid of such character that it can be washed and settled out from the washing water. It is washed and settled until free from soluble electrolytes.

The washed and purified polymer still in the form of latex is then subjected to an oxidizing treatment as follows: Sufficient alkali is added to give a pH of about 11, the temperature is raised to 200° F. and air is bubbled through the liquid for about 8 hours at about 200° F. Then the oxidized polymer still in the form of latex is washed substantially free from alkali, and the washed, oxidized latex is transferred to a vessel where coagulation or separation of the polymer in the form of a mass occurs. For this purpose dilute HCl may be added until a pH of about 3 is obtained shown by methyl orange. The coagulated mass is a pale yellow, tough, highly elastic coagulum. It is washed free from acid and then dried by masticating on hot mixing rolls. About 936 kilograms of dry polymer are obtained.

This polymer is reactive and upon being compounded and heated undergoes a transformation of which the following is a typical example, the ingredients being mixed by mastication.

*Example 2*

| | Kilograms |
|---|---|
| Polymer as above described | 100.00 |
| Diphenyl guanidine | .20 |
| Zinc oxide | 10.00 |
| Carbon black | 20.00 |
| Stearic acid | .50 |

This mixture may be sold in bulk in the form of rubber-like sheets which may be purchased by buyers who use it for many different purposes by a simple heating operation, i. e., molding and curing, as set forth below by way of illustration. More frequently, however, the polymer is purchased as such and the compounding or mixing, illustrated by Example 2, effected by the buyer or user thereof.

B. TRANSFORMATION OF INTERMEDIATE PRODUCTS INTO FINAL PRODUCT

*Example 3.*—The polymer described above is placed in a mold and heated to about 290° F. for about 45 minutes.

This step may be called curing. It comprises an oxidation in the dry or solid phase and instead of zinc oxide other curing agents of an oxidizing character can be used, e. g., lead oxides, bismuth oxides, arsenic oxides, manganese oxides, organic peroxides, aryl and aralkyl nitro and polynitro compounds and other oxidizing agents effective under the relatively high temperatures of the curing operation.

Attention is called to the fact that when the user of the intermediate material gets it, it has not lost its capacity to be transformed, not only in a physical sense, i. e., into different shapes, etc., but also in a chemical sense. Indeed it is the chemical transformation of the intermediate product which makes it valuable in the hands of the buyer, because it is that transformation which brings out the latent or inchoate valuable properties of the ultimate article.

In other words, two chemical transformations occur, the first being the reaction or reactions by which the intermediate material is formed by the manufacturer thereof and the second the reaction or transformation which occurs when the manufacturer's customer buys the intermediate material and uses it in his particular process.

I have found that there is a close correlation between the degree of success of the intermediate material in the hands of users thereof and the manner in which the intermediate material is made and my present invention is directed to improvements in the preparation of the intermediate material which are reflected in improved properties of the final product made therefrom.

To explain the nature of said improvement in the intermediate product and its influence on the final product, I will point out the results obtained when the step of oxidation is omitted in the procedure of Example 1.

*Example 4.*—Proceed as in Example 1, but omit the oxidizing step.

The intermediate polymer thus obtained is softer and less elastic than that obtained in Example 1. Moreover, upon compounding and then curing as in Examples 2 and 3, the effect of omitting the oxidation is manifested by the following properties of the cured polymer, in relation to a polymer made in the same manner in all respects except that the step of oxidation in the preparation of the intermediate polymer is included.

|  | Cured polymer made without the oxidizing step | Cured polymer made with the oxidizing step |
|---|---|---|
| Tensile strength | 600 lbs./sq. in. | 1000 lbs./sq. in. |
| Elongation | 700% | 500% |
| Permanent set or deformation after elongation | 100% | 20% |

The effect of the oxidation in the preparation of the intermediate product is thus reflected clearly in a marked improvement in the properties of the final product made from said intermediate product. These properties show a marked improvement in mechanical strength, elasticity and toughness.

The reason for said improvement may be explained as follows:

The action of the sodium polysulphide on the ethylene dichloride is a reaction wherein chlorine is split off followed by condensation and may be represented as follows, R representing $C_2H_4$.

A.   $Cl.R.Cl + Na_2S_4 = Cl.R.S_4Na + NaCl$

B.   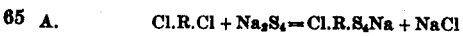

This continues until a long chain is built up having the formula

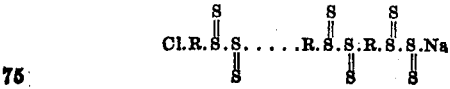

which loses halogen and acquires —SH terminals as follows:

C. 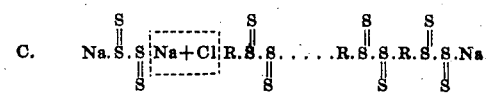

D. 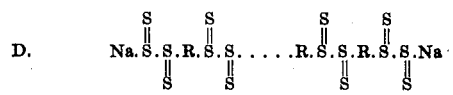

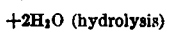

E. 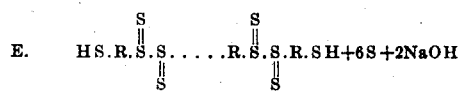

This reaction comes to equilibrium and although the size of the molecule is large, it will not increase beyond a certain point because the ratio of condensation by that type of reaction becomes extremely slow.

It was conceived that if the size of the molecules of the intermediate product could be further increased, by a different reaction, then the strength of the final product caused by curing the intermediate product might be improved and it was found that the sodium polysulphide reaction product produced as above described, was capable of condensation through oxidation while in the dispersed state, in other words, the sodium polysulphide intermediate reaction polymer was found to be a good reducing agent and upon causing oxidation and subsequent separation and curing of the oxidized polymer, improvement in mechanical strength and elasticity was effected as proven by the above data.

The action of the oxidizing reagent can be explained as follows, the —SH terminals being converted into —SNa terminals because of the strongly alkaline conditions:

F. 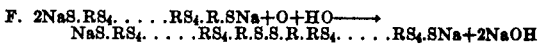

This oxidation clearly produces a great increase of the length of the molecule.

The oxidation reaction is carried out in an alkaline medium and under such conditions especially with the aid of a dispersing agent, the oxidized polymer remains as a latex-like liquid.

Upon acidification, coagulation occurs. This can be explained by the conversion of the sodium terminals to hydrogen terminals and the destruction of the dispersing agent which in the example given is magnesium hydroxide.

A large variety of oxidizing agents may be used instead of air. The sodium polysulphide-ethylene dichloride reaction product polymer, is an excellent reducing agent in alkaline solution, a strong reducing agent, as it must obviously be in order to be oxidized by merely blowing air through its alkaline solution. With this knowledge, the chemist may employ any oxidizing agent effective in alkaline solution, e. g., hypohalites, hydrogen peroxide, metallic peroxides, perborates, etc.

Attention is directed to the fact that the oxidation step is preferably carried out under definitely alkaline conditions, as indicated in Example 1 by a pH of about 11. It has been found that the oxidation is very favorably influenced by said alkaline condition.

Of course, consideration of cost places a commercial limit and in seeking a cheap oxidizing agent, it was found that alkaline polysulphides play a dual role provided that enough is used in relation to the ethylene dichloride. If enough is used, i. e., about 2 mols of an alkaline polysulphide to about 1 mol of ethylene dichloride, then a part of the alkaline polysulphide, i. e., about 1 mol, acts to introduce the polysulphur radicals into the ethylene radical as in Equations A to E above, whereby the initial polymer is formed as a conjugated polysulphur complex as shown, and the other part acts as an oxidizing agent as in Equation F above. In playing its oxidizing role, it is the sulphur of the inorganic polysulphide which acts as the oxidizing agent, thus:

$$2NaS.RS_4\ldots.RS_4.R.SNa+S \longrightarrow$$
$$NaS.RS_4\ldots.RS_4.R.S.S.R.RS_4\ldots.RS_4.NaS+Na_2S$$

Thus, by employing about 2 mols of sodium polysulphide to 1 mol of ethylene dichloride instead of the equimolecular proportions of Example 1, a polymer can be obtained which upon subsequent curing, produces a cured product having mechanical strength and other properties similar to that obtained from the product of Example 1, even though no air is blown through the suspension. The reaction is however a 2-stage reaction nevertheless, the polysulphide playing two different roles in the respective stages. This is illustrated by the following examples:

*Example 5.*—3000 liters of 2 molar sodium tetrasulphide solution containing 6000 gram mols of the tetrasulphide are treated with 8 kilograms of NaOH followed by 20 kilograms of $MgCl_2 6H_2O$ in a reaction vessel provided with coils for heating and cooling and an agitator. Then 3000 mols or about 297 kilograms of ethylene dichloride are gradually added during about 3 hours at a temperature of about 160° F. After all the ethylene dichloride has been added the temperature is raised to about 200° F. and maintained there for about 3 hours.

This 3 hour heating is comparable with the air-blowing step of Example 1, the additional polysulphide acting as an oxidizing agent, i. e., the first step is the formation of the initial polymer consisting of a conjugated chain of polysulphur complexes alternating with ethylene radicals and the second stage is the oxidation of this polymer. In these two stages the sodium polysulphide plays different roles.

The polymer thus obtained is in the form of a latex which is washed and coagulated as in Example 1, and compounded and cured as in Examples 2 and 3, and the cured polymer is found to have properties substantially identical with those of the cured polymer obtained from the intermediate polymer where oxidation was effected by a current of air (Example 1).

The reaction of the sodium polysulphide with the ethylene dichloride is one wherein the chlorine is removed and its place taken by a polysulphur group. See Equations A to E above. There is no question that this occurs because sodium chloride is one of the by-products. Instead of chlorine, other substituents may be employed, including bromine, iodine, nitrate, sulphate, carbonate, acetate, propionate, etc., in fact any substituent which is split off during the reaction. Ethylene dichloride has been used as an illustrative example, but the invention is not at all limited to that compound and includes a large number of compounds where there is a substituent attached to each of at least two different carbon atoms which substituent is split off during the reaction as shown in the list as set forth below. Any of the compounds of this list can be substituted for the ethylene dichloride of Examples 1 and 5 in the respective molecular proportions therein set forth. In this list, the symbols X and X' represent, respectively, a substituent on each of two different carbon atoms which substituent is split off during the reaction.

$$X.(CH_2)_n X'$$

where $n$ may be 1 to 20 or more

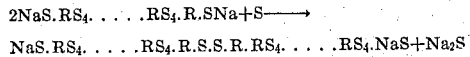

2,3 disubstituted butane $$\begin{array}{c} CH_3.CH.CH_3 \\ |\phantom{XX}| \\ X\phantom{X}X' \end{array}$$

2,3 disubstituted propane $$\begin{array}{c} CH_3.CH_2.CH.CH_2CH.CH_2.CH_3 \\ |\phantom{XXXXX}| \\ X\phantom{XXXXX}X' \end{array}$$

3,5 disubstituted heptane $$\begin{array}{c} X.CH_2.CH.CH_2.X' \\ | \\ CH_3 \end{array}$$

Disubstituted isobutane $$X.C_2H_4O.C_2H_4.O.C_2H_4.X'$$

Disubstituted ethoxy ethyl ether $$X.CH_2.O.CH_2.X'$$

Disubstituted methyl ether $$XC_2H_4.S.C_2H_4X'$$

Disubstituted thio ethyl ether $$X.C_2H_4O.CH_2X'$$

Disubstituted methyl ethyl ether $$\begin{array}{c} CH_3 \\ | \\ X.CH_2O.CH_2.C.CH_2.O.CH_2.X' \\ | \\ CH_3 \end{array}$$

Disubstituted 1,3 methoxy 2,3 dimethyl propane $$X.CH_2.S.CH_2.X'$$

Disubstituted thio methyl ether $$X.CH_2.CH_2.CH_2.O.CH_2.O.CH_2.CH_2.CH_2.X'$$

Disubstituted dipropyl fomal $$X.CH_2.CH_2.O.CH_2.O.CH_2.CH_2.X'$$

Disubstituted diethyl formal $$\begin{array}{c} XCH_2OCH_2CH.OCH_3 \\ | \\ X' \end{array}$$

Disubstituted dimethoxy ethane $$X.(CH_2)_2O\langle\phantom{X}\rangle O.(CH_2).X'$$

Disubstituted para diethoxy benzene $$X.CH_2O.CH_2.CH_2.OCH_2X'$$

Disubstituted dimethoxy ethane $$X.CH_2.CH_2.CH_2.S.CH_2.CH_2.CH_2.X'$$

Disubstituted dipropyl thio ether $$\begin{array}{c} XCH_2.CH_2.O.C.O.CH_2.CH_2X' \\ \|\\ O \end{array}$$

Disubstituted diethyl carbonate $$X.CH_2.CH_2.SO_2.CH_2.CH_2.X'$$

Disubstituted diethyl sulphone

X.CH₂.CH=CH.CH₂.X'

Disubstituted butene 2, 3

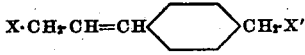

Disubstituted 3 tolyl propene 2, 3

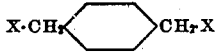

Disubstituted para xylene

Disubstituted para ethyl butyl benzene

It is of great advantage to prepare the intermediate product in the form of a dispersion. This permits the substantially complete removal of by-products as by washing, prior to coagulation, so that a purified intermediate product is obtained. Not only that, but in its dispersed form, the polymer, particularly in alkaline solution, is susceptible of oxidation as set forth, to produce an improved intermediate product capable of yielding a superior product upon subsequent curing. Instead of magnesium hydroxide other dispersing agents may be used, e. g., aluminum hydroxide, chromium hydroxide, ferric hydroxide, gelatin, albumen, casein, etc.

Instead of sodium tetrasulphide, other polysulphides may be used, e. g., polysulphides of ammonium, potassium, lithium and in general polysulphides of metals that do not form insoluble sulphides.

I am not confined to a rigid separation of the two kinds of reaction herein set forth. There may be overlapping. The initial reaction of the polysulphide is one of chain formation. The subsequent reaction, whether caused by polysulphides or other oxidizing agent is a lengthening of the chain or chains already formed.

I claim:

1. The process which comprises providing an organic compound having a substituent joined to each of two different carbon atoms which substituent is split off during the reaction, reacting this with an alkaline polysulphide, oxidizing the product, and obtaining a polymer in intermediate potentially reactive form capable of being cured by a subsequent heat treatment.

2. The process which comprises providing an organic compound having a halogen joined to each of two different carbon atoms, reacting this with an alkaline polysulphide, oxidizing the product, and obtaining a polymer in intermediate potentially reactive form capable of being cured by a subsequent heat treatment.

3. The process which comprises providing an organic compound having a substituent joined to each of two different carbon atoms which substituent is split off during the reaction; reacting this with an alkaline polysulphide in a dispersion medium and obtaining a polymer in dispersed form; oxidizing the polymer while still in dispersed form; and separating the polymer in an intermediate potentially reactive form capable of being cured by a subsequent heat treatment.

4. The process which comprises providing an organic compound having a substituent joined to each of two different carbon atoms which substituent is split off during the reaction, reacting this with an alkaline polysulphide in a dispersion medium and obtaining a polymer in dispersed form; applying an oxidizing agent to the dispersion under alkaline conditions; and obtaining a polymer in intermediate potentially reactive form capable of being cured by a subsequent heat treatment.

5. The process which comprises providing an organic compound having a substituent joined to each of two different carbon atoms which substituent is split off during the reaction, reacting this with an alkaline polysulphide and oxidizing the product, in an alkaline dispersion medium in the presence of a dispersion agent; obtaining a polymer in the form of a latex-like liquid, and separating said polymer from said liquid in intermediate potentially reactive form capable of being cured by a subsequent heat treatment.

6. The process which comprises providing an organic compound having a substituent joined to each of two different carbon atoms which substituent is split off during the reaction; reacting this with a quantity of alkaline polysulphide sufficient to cause the formation of an organic polymer and an additional quantity of polysulphide to oxidize said polymer; and obtaining a polymer in intermediate form, capable of being cured by a subsequent heat treatment.

7. A potentially reactive intermediate polysulphide polymer, capable of being cured when heated, and resulting from the action of an oxidizing agent on the reaction product of an alkaline polysulphide with an organic compound having a substituent on each of two different carbon atoms which substituent is split off during the reaction.

8. A potentially reactive intermediate polysulphide polymer, capable of being cured when heated, and resulting from the process which comprises providing an organic compound having a substituent joined to each of two different carbon atoms which substituent is split off during the reaction; reacting this with a quantity of alkaline polysulphide sufficient to cause the formation of an organic polymer and an additional quantity of polysulphide to oxidize said polymer.

JOSEPH C. PATRICK.